United States Patent [19]

Alet et al.

[11] Patent Number: 4,650,420
[45] Date of Patent: Mar. 17, 1987

[54] RELIEF SENSOR FOR VEHICLE MOTION SIMULATORS

[75] Inventors: Robert Alet, Cergy; Jean Marotte, Verneuil sur Seine, both of France

[73] Assignee: Thomson-CSF, Paris, France

[21] Appl. No.: 721,455

[22] Filed: Apr. 9, 1985

[30] Foreign Application Priority Data

Apr. 19, 1984 [FR] France ............... 84 06215

[51] Int. Cl.⁴ .............................. G09B 9/04
[52] U.S. Cl. ........................................ 434/29
[58] Field of Search .......... 434/29, 69, 62, 150, 434/152

[56] References Cited

U.S. PATENT DOCUMENTS 3,283,418 11/1966 Brewer ............................. 434/69
4,233,755 11/1980 Boniface et al. ................. 434/29
4,251,931 2/1981 McKechnie ................... 434/62 X
4,538,992 9/1985 Summerfield ..................... 434/38

FOREIGN PATENT DOCUMENTS 2044859 2/1971 France .
2417131 9/1979 France .
2444310 7/1980 France .
1000991 8/1965 United Kingdom .

Primary Examiner—William H. Grieb

[57] ABSTRACT

A relief sensor for a vehicle motion simulator of the type mounted on a carriage moving over a gantry above a relief model of the piece of ground. The skid of the relief sensor, which is in contact with the model, comprises relief portions at positions corresponding to the positions of the endmost wheels or track carrying rollers of the simulated vehicle.

12 Claims, 19 Drawing Figures

FIG_1
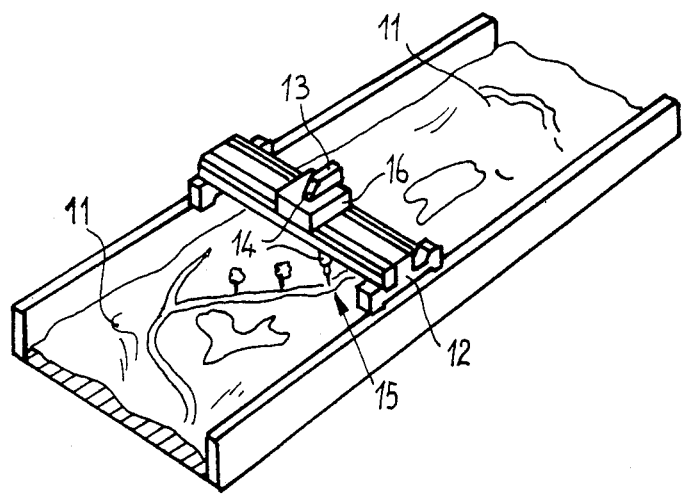
FIG_8
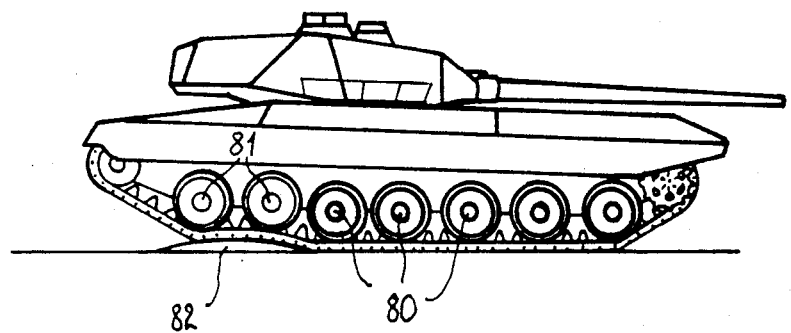

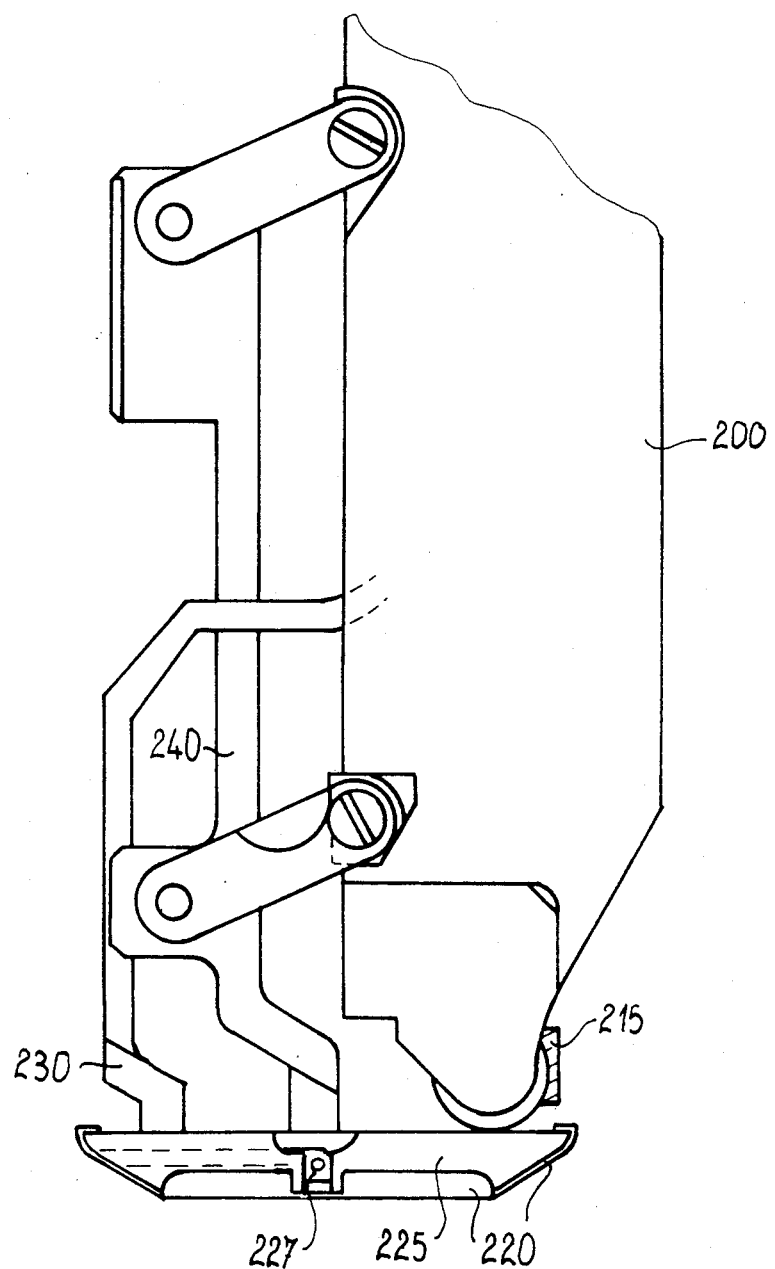
FIG_2 PRIOR ART

FIG_3 PRIOR ART
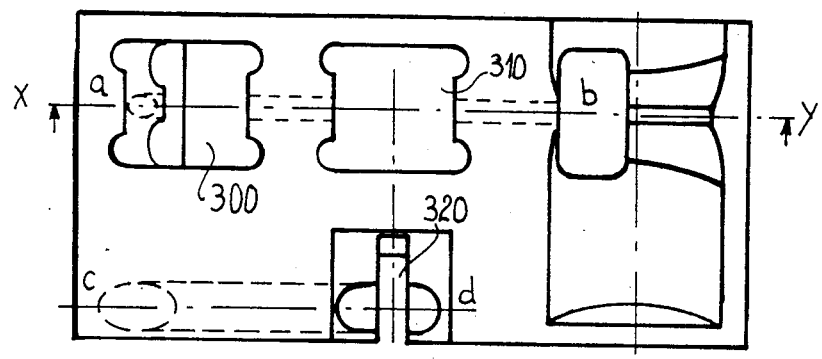
FIG_4 PRIOR ART
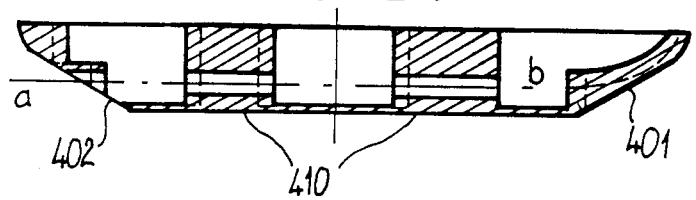
FIG_5 PRIOR ART
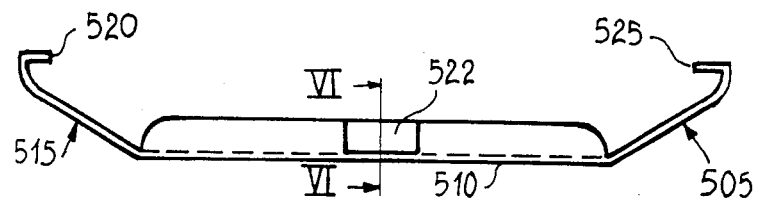
FIG_6 PRIOR ART
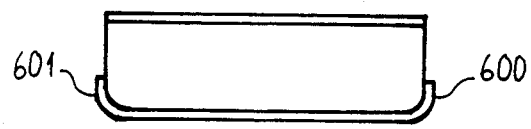

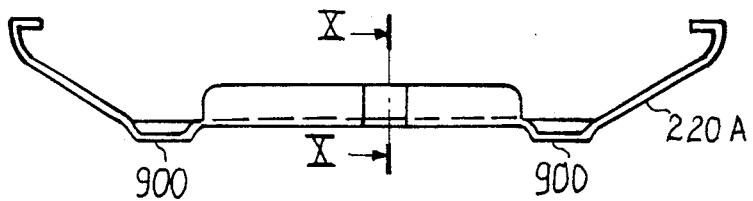
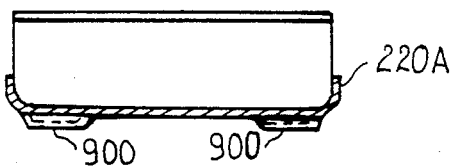
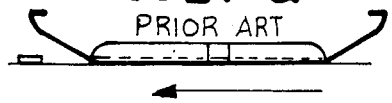
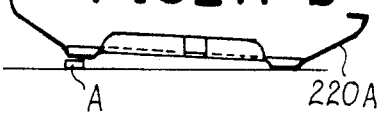
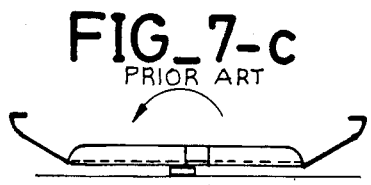
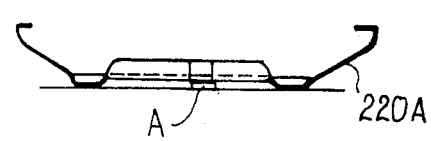
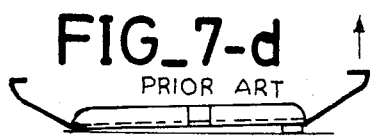
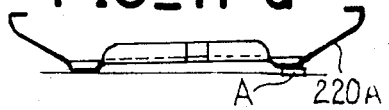

FIG_12
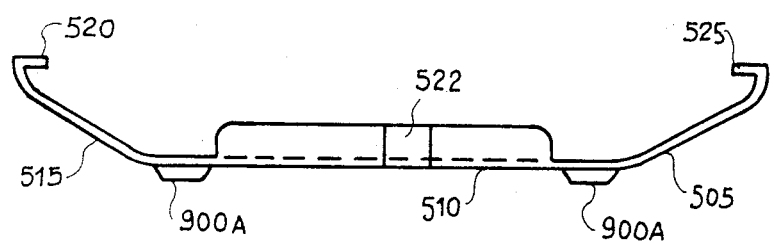
FIG_13
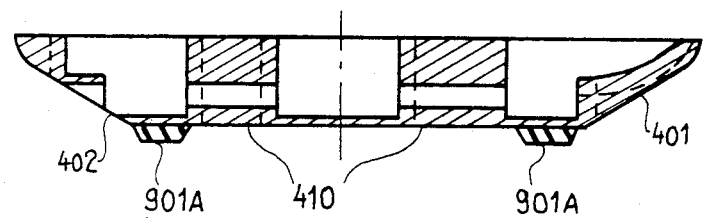

RELIEF SENSOR FOR VEHICLE MOTION SIMULATORS

BACKGROUND OF THE INVENTION

1. Field of the Invention

The present invention relates to a relief sensor for vehicle motion simulators.

The present invention relates to simulators for vehicle driving training. Its object is to restore as realistically as possible the motion of the simulated vehicles when they are assumed to be travelling over rugged ground and more particularly when they pass over an isolated obstacle of low height.

2. Description of the Prior Art

The training of drivers is now generally provided by means of simulators in which the pupil drivers are placed in environmental conditions similar to those of real driving. A display system restores for them the view of the road or of the ground travelled over whereas a mobile platform on which the driving seat is mounted subjects them to motions similar to those which the vehicle would undergo.

The purpose of the relief sensor of the invention is, in the case of an isolated obstacle of a height less than the ground clearance of the vehicle, to cause a pitching and/or rolling motion of the driving seat of the simulator only when the points of this sensor, corresponding to the position of the endmost wheels or track supporting rollers of the vehicle, or else corresponding to the zones of the vehicle where the suspension is stiffer, pass over the simulated obstacle.

SUMMARY OF THE INVENTION

A characteristic of the relief sensor of the invention is that the surface of its skid provided for sliding over the model comprises portions in relief in correspondence with the positions with the positions of the endmost wheels or track supporting rollers of the vehicle or with the zones of the vehicle where the suspension is stiffer.

BRIEF DESCRIPTION

The invention is illustrated by way of example in the attached drawings in which:

FIG. 1 is a perpective view of a relief model of a piece of ground and of a sensing and picture taking system mounted above the model;

FIG. 2 is a side view of the lower part of a prior art sensing and picture taking system;

FIG. 3 is a top view of a shoe forming part of the system of FIG. 2;

FIG. 4 is a section through the shoe of FIG. 3;

FIG. 5 is a side view of a skid for use in connection with the shoe of FIGS. 3 and 4;

FIG. 6 is an end view of the skid of FIG. 5;

FIGS. 7a to 7d illustrate the sequence of events when the skid of FIGS. 5 and 6 moves over an obstacle;

FIG. 8 is a side view of a tank moving over an obstacle;

FIG. 9 is a side view of a skid according to the invention;

FIG. 10 is a section along lines X—X of FIG. 9;

FIGS. 11a to 11d illustrate the sequence of events when the skid of FIGS. 9 and 10 moves over an obstacle;

FIG. 12 is a view similar to FIG. 9 of a modified skid of the invention; and

FIG. 13 is a view similar to FIG. 4, but of a shoe according to the invention.

While the invention is described in connection with a skid, it is equally applicable to a shoe.

As can be seen in FIG. 1, the picture transmitted to the display system as well as the motions of the driving seat are obtained from a relief sensing and picture taking system 14 which moves in contact with a model of the ground 11. This model simulates, on the desired scale, a land environment formed mainly from roads, pieces of ground, extents of water and of vegetation.

The sensing and picture taking system is mounted on a carriage 16 which moves over a gantry 12. The movements of the carriage on the gantry are controlled by a processor depending on the actions by the pupil driver on the controls. This assembly is particularly well adapted to training in driving tanks.

The lower part 15 of the system is shown in FIG. 2. It comprises principally an optical prism 215 and a relief sensing assembly formed by a shoe 225, a skid 220, articulation links 230 and 240 and connecting rods (not shown).

The prism feeds back vertically through an optical system (not shown) to a television camera 13 (FIG. 1) the light rays situated in an optical field similar to that of the driver.

Shoe 225 is hinged at the ends of two links 230 and 240 which are movable particularly with respect to the main structure 200. This latter is connected to the gantry and may move up or down with respect thereto. Its height above the model is adjusted more particularly so that the prism remains at a constant distance from the shoe.

FIGS. 3 and 4 show the shoe in a top view and in section. It may be machined from a block of metal of standard quality for example from aluminum or steel.

The two links 230 and 240 are hinged at universal joint portions (not shown), placed in housings 300 and 310, and which pivot about a first pin, not shown, placed in a bore a, b.

A second pin, only one end 227 of which can be seen in FIG. 2, pivots in a bore c, d (FIG. 3). This pin has a transverse bore in which is fitted the end, bent at 90°, of a roll sensing rod not shown.

During the driving exercise, the shoe moves vertically and pivots for pitching and rolling while following the relief of the model. These motions are sensed by potentiometric sensors (not shown), connected by rods to different points of the mechanism.

The shoe has for example a flat part 410, comprising openings and which is located between two end portions 401, 402 slanting with respect thereto. The central part corresponds, at the desired scale, to the surface determined by the gauge and wheel base of the vehicle simulated.

The endmost parts 401, 402 are slanted by an angle allowing the shoe to pass over simulated obstacles under conditions identical to those of the vehicle passing over real obstacles and more particularly of a tank. It is obvious that the shape of this shoe could be different for adapting it to the simulation of a vehicle of another type or for being able to slide directly in contact with the model. In the example described, because of the openings in the flat part, among other things, the shoe is provided with a skid 220.

This skid is shown in elevation and in section in FIGS. 5 and 6. Its shape corresponds to that of the shoe.

It is obtained from a rectangular shaped blank of small thickness made for example from copper or a copper-beryllium alloy.

With four rectangular cut-outs made at the four apices the blank may be then bent so as to form a skid having a central flat and rectangular part and two pairs of wings of unequal dimension.

The longest wings 505 and 515 are obtained, by a first bend along the small sides of the rectangle then by a second bend at their end parallel to the central part so as to form a resilient bend for securing the skid to the shoe (520 and 525).

The shortest wings are obtained simply by two 90° bends along the large sides of the rectangle and form two lateral flanges for retaining the skid on the shoe.

In the example described, a cut out 522 is made in one of the flanges for allowing the role sensing rod to pass therethrough and pivot.

The shoe and the skid thus defined have up to present provided a simulation judged sufficient of the motion of tanks.

Nevertheless, it is apparent that their central flat part is not the image of the bearing surface of surfaces, nor of the elements required for such bearing on the ground in most vehicles.

In particular, it cannot provide an exact restoration of the motion of a vehicle which passes over an isolated object.

FIG. 7 shows in fact that when the skid for example passes over such an obstacle, an unrealistic rocking of the skid and of the driving seat of the simulator occurs when the center of the skid passes over the obstacle (FIG. 7c).

On the other hand, observation of the motion of a tank passing over an isolated obstacle 82 (FIG. 8) shows that, very substantially like a four wheeled vehicle, the tank undergoes a pitching motion, accompanied possible by rolling when the obstacle is engaged under the first track supporting rollers 81 and comes back to the horizontal as soon as the obstacle is under the central rollers 80.

A first embodiment of the shoe of the invention consists, from a skid 220 of the prior art, in forming relief parts 900 by stamping or by forming with pliers. Skid 220A shown in FIGS. 9 and 10 comprises relief portions 900 at the four corners of its base. This example corresponds to a tracked tank or to a four wheeled vehicle. The number and position of these relief portions may possibly vary in accordance with the simulated vehicle.

Another embodiment shown in FIG. 12 consists in securing to a skid inserts 900A of appropriate shape and made from plastic by bonding or by any other fixing means, at positions on the skid so a to give rise to a pitching or rolling motion. In FIG. 13, similar inserts 901A are bonded to the shoe directly.

FIG. 11 shows the much more realistic motion of the skid 220A of the invention when its relief portions 220A pass over an isolated obstacle A.

What is claimed is:

1. A relief sensor for vehicle motion simulators mounted on a carriage moving over a gantry above a relief model of a piece of ground, movement of the carriage and of the gantry being controlled by a processor depending on actions of a user, said sensor having a lower part forming a skid for sliding over the model, said skid having relief portions at positions corresponding to endmost wheels or track carrying rollers of a simulated vehicle.

2. A relief sensor as claimed in claim 1, wherein said relief portions are stamped portions of the skid.

3. A relief sensor as claimed in claim 1, wherein said relief portions are separate inserts fixed to said skid.

4. A relief sensor for vehicle motion simulators mounted on a carriage moving over a gantry above a relief model of a piece of ground, movement of the carriage and of the gantry being controlled by a processor depending on actions of a user, said sensor having a lower part forming a skid for sliding over the model, said skid having relief portions at positions corresponding to zones of a simulated vehicle where a suspension thereof is stiffer than at other zones.

5. A relief sensor as claimed in claim 4, wherein said relief portions are stamped portions of the skid.

6. A relief sensor as claimed in claim 4, wherein said relief portions are separate inserts fixed to said skid.

7. A relief sensor for vehicle motion simulators mounted on a carriage moving over a gantry above a relief model of a piece of ground, movement of the carriage and of the gantry being controlled by a processor depending on actions of a user, said sensor having a lower part forming a shoe for sliding over the model, said shoe having relief portions at positions corresponding to endmost wheels or track carrying rollers of a simulated vehicle.

8. A relief sensor as claimed in claim 7, wherein said relief portions are stamped portions of the shoe.

9. A relief sensor as claimed in claim 7, wherein said relief portions are separate inserts fixed to said shoe.

10. A relief sensor for vehicle motion simulators mounted on a carriage moving over a gantry above a relief model of a piece of ground, movement of the carriage and of the gantry being controlled by a processor depending on actions of a user, said sensor having a lower part forming a shoe for sliding over the model, said shoe having relief portions at positions corresponding to zones of a simulated vehicle where a suspension thereof is stiffer than at other zones.

11. A relief sensor as claimed in claim 10, wherein said relief portions are stamped portions of the shoe.

12. A relief sensor as claimed in claim 10, wherein said relief portions are separate inserts fixed to said shoe.

* * * * *